US008973066B2

(12) United States Patent
Hilson et al.

(10) Patent No.: US 8,973,066 B2
(45) Date of Patent: Mar. 3, 2015

(54) MEDIA CONTENT DELIVERY

(75) Inventors: Scott Hilson, Media, PA (US); Lisa Hoppes, Glenside, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 83 days.

(21) Appl. No.: 13/295,444

(22) Filed: Nov. 14, 2011

(65) Prior Publication Data

US 2013/0125153 A1    May 16, 2013

(51) Int. Cl.
| | |
|---|---|
| H04N 7/173 | (2011.01) |
| H04H 60/00 | (2008.01) |
| H04N 21/658 | (2011.01) |
| H04N 21/239 | (2011.01) |
| H04N 21/25 | (2011.01) |
| H04N 21/2543 | (2011.01) |
| H04N 21/262 | (2011.01) |
| H04N 21/472 | (2011.01) |
| H04N 7/16 | (2011.01) |
| G06Q 30/00 | (2012.01) |

(52) U.S. Cl.
CPC ............ *H04H 60/00* (2013.01); *H04N 21/6581* (2013.01); *H04N 21/6582* (2013.01); *H04N 21/2393* (2013.01); *H04N 21/251* (2013.01); *H04N 21/25435* (2013.01); *H04N 21/26225* (2013.01); *H04N 21/26266* (2013.01); *H04N 21/47208* (2013.01)
USPC ........ 725/87; 725/8; 725/23; 725/24; 725/97; 705/14.1; 705/14.25; 705/14.55

(58) Field of Classification Search
CPC .......... H04N 21/2543; H04N 21/2393; H04N 21/6581; H04N 21/6582; H04N 2021/00; H04N 2021/20
USPC .......... 725/8, 23, 24, 87, 97; 705/14.1, 14.25, 705/14.55
See application file for complete search history.

(56) References Cited

U.S. PATENT DOCUMENTS

| | | | |
|---|---|---|---|
| 8,176,192 B2* | 5/2012 | Miao et al. | 709/231 |
| 8,355,948 B2* | 1/2013 | Mason | 705/14.1 |
| 8,424,048 B1* | 4/2013 | Lyren et al. | 725/106 |
| 2007/0130583 A1* | 6/2007 | Thiagarajan et al. | 725/37 |
| 2008/0059987 A1* | 3/2008 | Bates et al. | 725/8 |
| 2009/0006184 A1* | 1/2009 | Leach et al. | 705/10 |
| 2009/0313665 A1* | 12/2009 | Rouse | 725/93 |
| 2010/0192176 A1* | 7/2010 | Beppu et al. | 725/34 |
| 2010/0205625 A1* | 8/2010 | Beyabani et al. | 725/8 |

OTHER PUBLICATIONS

Groupon, available at Groupon.com, accessed Nov. 2, 2011.
LivingSocial Inc., available at Livingsocial.com, accessed Nov. 2, 2011.

* cited by examiner

Primary Examiner — Hoang-Vu A Nguyen-Ba
(74) Attorney, Agent, or Firm — Banner & Witcoff, Ltd.

(57) ABSTRACT

A server can receive information identifying media content to be offered to users at a discount or at a particular time of release. The offer can also include information identifying a minimum number of acceptances by users needed for the offer to be valid. During a predetermined period, if the number of acceptances has reached or exceeded the minimum number needed, the server may transmit a media stream containing the media content to the users. Furthermore, the offer may include multiple tiers of discounts and/or times of release.

19 Claims, 8 Drawing Sheets

MEDIA CONTENT DELIVERY

BACKGROUND

In order to promote sales, businesses create discount offers for goods and services. As discount services become more and more popular, it may be desirable to develop and implement more convenient, dynamic and customizable ways of offering and delivering discounts to users.

SUMMARY

Some of the various features described herein relate to offering and delivering a media content offer. In some embodiments, a server, such as a content processing server, may receive information identifying an item of media content and a time of release for the item of media content. The server may also receive information identifying a corresponding minimum number of acceptances required for the time of release to be valid. The information identifying the time of release may include information identifying multiple times of release, where each time of release corresponds to a different minimum number of acceptances. Prior to the time of release, the server may receive acceptance messages from a plurality of users, the acceptance messages indicating that corresponding users desire to access the media content at the time of release for the item of media content. If a number of acceptance messages has met or exceeded a minimum number of acceptances required, the server may transmit, or direct an associated computing device to transmit, one or more media streams containing the item of media content to the corresponding users.

In some embodiments, an item of media content may be a theatrical release of a movie, and the one or more media streams may be one or more video on demand sessions carrying the movie. Furthermore, the one or more video on demand sessions may be made available for transmission prior to the theatrical release date of the movie, such as a week prior to the theatrical release date. The one or more video on demand sessions may be a multicast video session.

In some embodiments, a server may receive information identifying a group pricing discount for an item of media content, the information identifying a group pricing discount identifying a plurality of group discount tiers. Furthermore, each group discount tier may include a different minimum number of acceptances and corresponding discount.

In some embodiments, a server may group, in response to a user's request, a subset of acceptances into a media content temporary viewing group for the user. For example, the temporary viewing group may include a plurality of other users associated with the requesting user via a social networking service. Furthermore, the server may transmit the item of media content as, for example, a multicast transmission to members of the temporary viewing group. Playback navigation controls by one member of the group may be shared with viewing devices of other members of the group during the multicast transmission.

In some embodiments, the server may make available for retransmission media content to one or more of the users after an initially making the content available for transmission and limit users to a time window for retransmissions. The server may also determine a number of times a first user has accessed the item of media content during a time window, and in response to the first user accessing the item of media content more than a predetermined minimum retransmission amount during the time window, transmit an offer message to the first user for purchasing a copy of the item of media content.

In some embodiments, the server may determine that one or more preferences for a plurality of users match the item of media content and transmit an offer for a discount price and time of release to the plurality of users having preferences that match the item of media content. Furthermore, user preferences may include, for example, a genre preselected by the user, a genre of an item of media content previously purchased or viewed by the user, and one or more preferences derived from a social media account associated with the user.

This summary is not intended to identify critical or essential features of the disclosures herein, but instead merely summarizes certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
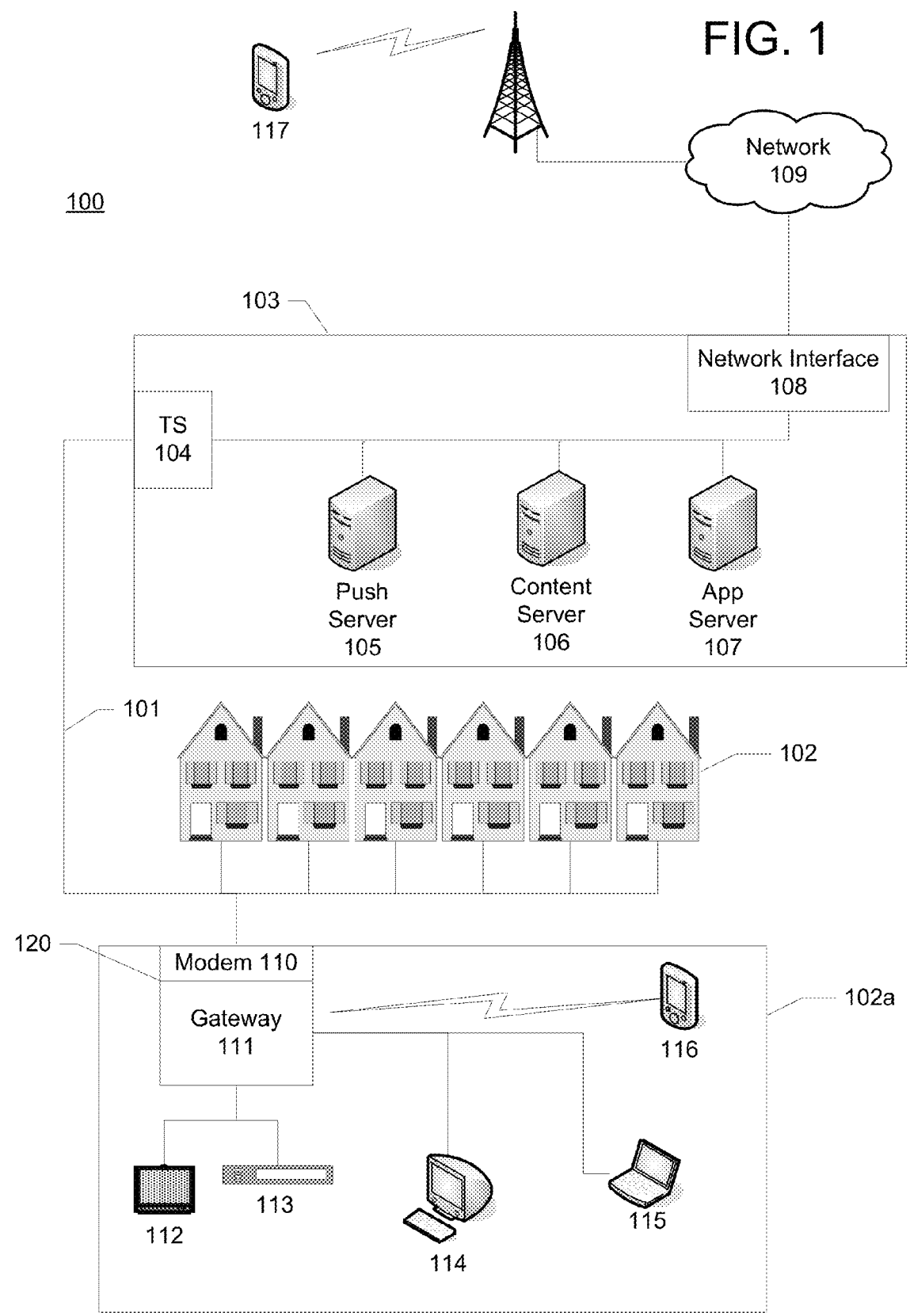
FIG. 1 illustrates an example information access and distribution network.

FIG. 1 illustrates an example information access and distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax (HFC) distribution network. Such networks 100 use a series of interconnected communication lines 101 (e.g., coaxial cables, optical fibers, wireless, etc.) to connect multiple homes 102 to a central office or headend 103. The headend 103 may transmit downstream information signals onto the lines 101, and each home 102 may have a receiver used to receive and process those signals.

There may be one line 101 originating from the central office 103, and it may be split a number of times to distribute the signal to various homes 102 in the vicinity (which may be many miles) of the central office 103. Although the term home is used by way of example, locations 102 may be any type of user premises, such as businesses, institutions, etc. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths.

The central office 103 may include a termination system (TS) 104, such as a cable modem termination system (CMTS), which may be a computing device configured to manage communications between devices on the network of lines 101 and backend devices such as servers 105-107 (to be discussed further below). The TS may be as specified in a standard, such as, in an example of an HFC-type network, the Data Over Cable Service Interface Specification (DOCSIS) standard, published by Cable Television Laboratories, Inc. (a.k.a. CableLabs), or it may be a similar or modified device instead. The TS may be configured to place data on one or more downstream channels or frequencies to be received by devices, such as modems at the various homes 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various homes 102 in the network (or more specifically, to the devices in the homes 102 that are configured to detect such notifications). The central office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting data such as television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102. And as will be discussed in greater detail below, another application server may be responsible for receiving user remote control commands, and processing them to provide an intelligent remote control experience.

An example home 102*a* may include an interface 120. The interface may comprise a device 110, such as a modem, which may include transmitters and receivers used to communicate on the lines 101 and with the central office 103. The device 110 may be, for example, a coaxial cable modem (for coaxial cable lines 101), a fiber interface node (for fiber optic lines 101), or any other desired modem device. The device 110 may be connected to, or be a part of, a gateway interface device 111. The gateway interface device 111 may be a computing device that communicates with the device 110 to allow one or more other devices in the home to communicate with the central office 103 and other devices beyond the central office.

The gateway 111 may be a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
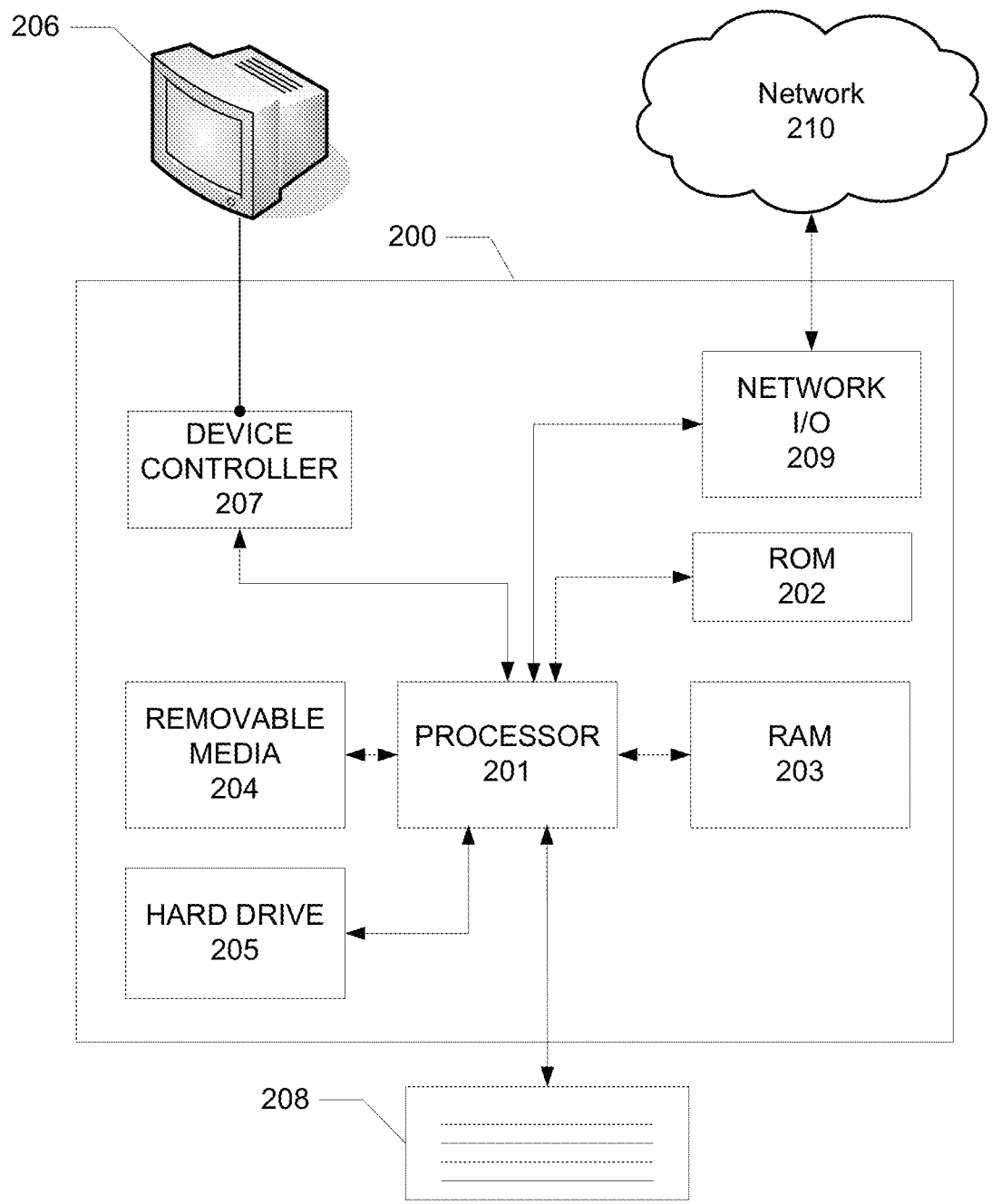
FIG. 2 illustrates an example hardware platform on which the various elements described herein can be implemented.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, hard drive, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

FIGS. 3A-D illustrate an example process for providing content to one or more users. The steps may, but need not, all be performed by the same computing device, such as one of the servers 105-107 (which, in turn, can be implemented using the computing device 200 described above). The example process for providing media content will be described, as a non-limiting example, as being performed by content server 106.

In step 301, a device such as content server 106 may receive one or more offer(s) for item(s) of content from a party such as a content supplier. The offer may be delivered as a transmitted data structure that includes, for example, one or more of media content, information identifying the media content, and information identifying one or more tiers for the advance release of the media content. If tiers are present, each tier can identify a threshold number of acceptances required for the tier to be valid, and a time of release and/or discount price that is effective if the tier is valid. The offer may also include information identifying one or more recipient groups of the media content offer (e.g., recipient groups based on geography, social media, genre, and/or particular user preferences) and information identifying whether a media content offer will include selecting media content from one or more media content. Information contained in the transmitted data structure may be stored by the content server 106 and will be explained in detail with respect to the examples described below.

Types of content may include, but are not limited to, audio content, video content, audiovisual content, and other data content. Furthermore, the content may be streaming media, such as streaming audio, video, audiovisual or other data content. As disclosed in further detail in the examples below, streaming media may be delivered by a streaming provider to one or more end-user devices. Alternatively, the content may be downloaded to one or more end-user devices or to any other devices located or associated, for example, with a home 102. Examples of audio content include, but are not limited to, recorded, streaming, or live music, book recordings, live or recorded lectures, audio content extracted from audiovisual content, etc. Examples of video content include, but are not limited to, movies, sneak preview trailers, interviews with cast or crew, behind the scenes footage, television shows, lectures, concerts, operas, etc. In particular, movie content may, for example, include a theatrical release of a movie, a DVD release of a movie, a video on demand (VOD) release of a movie, and an online on demand release of a movie. Content suppliers may include, but are not limited to, movie studios, producers, musicians, developers and any person or entity that owns or licenses the content. As a non-limiting example, a content supplier may be a movie studio, and content may be a pre-release theatrical movie.

In step 302, the content server 106 may store, in one or more data storage locations, one or more media content received in the transmitted data structure from a content supplier. For example, a video file containing a movie can be downloaded to the server 106 for storage prior to the release time. Alternatively, the content server 106 may store information identifying the one or more offered media content, rather than the one or more media content itself. Data storage locations may include, for example, a location within central office 103, a dedicated storage location within the network 109, or another central storage location that may be accessed by one or more central offices 103.

In some embodiments, the content may be associated with a time of release (which can be a time of day, calendar date, day of week, or any other desired point in time). For example, theatrical release movies often have a first date on which theatres are permitted to begin showing the movie to patrons (e.g., movie release night, movie release time, etc.). Musical releases commonly have a first date on which the songs are made available on the radio, or for purchase or download. A given piece of content can have multiple release dates, for different stages of release. For example, a theatrical release movie may also have a second date on which the movie is available for rental on DVD and/or pay-per-view on demand viewing, and a third date on which the movie is transmitted on a pay service (e.g., Home Box Office (HBO)).

In step 303, the content server 106 may store (or otherwise retain for access) in one or more storage locations information indicating the time of release of the one or more media content, received in the transmitted data structure from a content supplier. The time of release information may include information indicating when the media content will be released to the general public, a recipient group, or any other group, as disclosed in further detail in the examples below.

The time of release information may also include information identifying one or more recipient groups of individuals who are to receive one or more different times of release. For example, the time of release information may indicate separate times of release of the media content for the general public and for a select group of individuals, where the select group of individuals may be a recipient group and include individuals registered with a service provided by an entity that owns or operates the content server 106. For example, the time of release for the recipient group (e.g., individuals registered with a particular service) may be a time prior to the theatrical release date or time of a movie, such as a pre-release date, and the time of release for the general public may be the theatrical release date of a movie. As another non-limiting example, the time of release may correspond to the theatrical release date of a movie. In this example, a recipient group and the general public may have an opportunity to view media content on the theatrical release date of the movie. However, the recipient group may benefit from a service (e.g., a provider's service) by viewing, for example, the theatrical release of a movie from their own homes and/or end-user devices. Furthermore, the theatrical release of the movie may be offered at a discounted price (e.g., cheaper than purchasing a movie theater ticket) to the select group of individuals. Additionally, time of release may be based on an event (e.g., a holiday or sports event). In some embodiments, one or more media content may be released a predetermined amount of time (e.g., 24 hours) after the Super Bowl. For example, the media content may be a replay of the super bowl, a sports movie, etc. In other embodiments, one or more media content may be released on a holiday or holiday weekend, such as Fourth of July Weekend.

The time of release may also take into account the time zone or geographic location of one or more central offices 103 and/or homes 102. As a non-limiting example, the time of release may be July $5^{th}$ at 8 P.M. EST. As another non-limiting example, the time of release may be 8 P.M. EST for central offices 103 and homes 102 located in Eastern Standard Time zones and 7 P.M. CST for central offices 103 and homes 102 located in Central Standard Time zones. Any other combination of time zone and geographic location is possible. The time of release may also vary based on other factors, as disclosed in further detail in the examples below.

In step 304, the server may determine whether multiple tiers of time of release exist. Whether a time of release is tiered may be indicated, for example, in the media content offer received in the transmitted data structure from a media content supplier (e.g., at step 301). Time of release tiers may vary based on many factors, including the number of end users or content consumers that accept an offer to consume one or more media content. For example, the more the acceptances, the earlier the time of release. One or more tiers for the time of release may exist. As a non-limiting example, in a single tier time of release system, the one or more media content may be released on July $5^{th}$ if 500 end users or content consumers have accepted an offer by July $5^{th}$ or a predetermined time prior to July $5^{th}$. In a double tier time of release system, the one or more media content may be released on July $3^{rd}$ if 800 end users or content consumers have accepted an offer by July $3^{rd}$ or a predetermined time prior to July $3^{rd}$ and on July $5^{th}$ if 500 end users or content consumers have accepted an offer by July $5^{th}$ or a predetermined time prior to July $5^{th}$. The tiered time of release structure may include any number of tiers.

Time of release tiers may also vary based on user history. In some embodiments, time of release may depend on the number of times a user has utilized the media content delivery system (e.g., accepted a media content offer). For example, the greater the number of times a user has utilized the media content delivery system, the earlier the time of release. As a non-limiting example, in a triple tier time of release system, the one or more media content may be released on July $3^{rd}$ for acceptor-users that have previously accepted at least ten media content offers, on July 5$^{th}$ for acceptor-users that have previously accepted between five and ten media content offers, and on July 7$^{th}$ for acceptor-users that have previously accepted fewer than five media content offers. In other embodiments, time of release may depend on a point-rewards system, where users may accumulate points for actions they may take that are associated with a service provider system. Actions may include, but are not limited to, providing a rating for a previously viewed movie, purchasing service provider merchandise, previously accepting a media content offer, recommending content to other users, etc. Predetermined number of points may be associated with each action. For example, if a user provides a rating for a previously viewed movie, the media content delivery system may award the user five points. If a user accepts a media content offer, the system may award the user ten points. Furthermore, the media content delivery system may accumulate and store points for each user. Accordingly, the server may determine the time of release based on the number of points each acceptor-user has accumulated. As a non-limiting example, in a double tier time of release system, the one or more media content may be released on July 3$^{rd}$ for acceptor-users that have accumulated at least fifteen points and July 5$^{th}$ for acceptor-users that have accumulated at least seven points. These tiered time of release structures may include any number of tiers.

Furthermore, a tiered time of release may allow the user to choose a time of release from multiple times of release. For example, a user may have a choice of times of release ranging from the earliest time of release based on the number of acceptances to any number of later times of release. In the above example, if 800 end users have accepted an offer by July 3$^{rd}$, all of the acceptor-users may be offered the option to consume the content on July 3$^{rd}$ (e.g., 800 or more selections) or July 5$^{th}$ (e.g., 500 or more selections). Alternatively, acceptor-users may have a time range to consume the content, the earliest of which may be the earliest time of release based on the number of acceptances. In the above example, if 800 end users have accepted an offer by July 3$^{rd}$, all of the acceptor-users may be offered the option to consume the content one or more times between July 3$^{rd}$ and July 5$^{th}$. In step 305, the server may store, in one or more data storage locations, the one or more tiered times of release.

In step 306, the server stores, in one or more data storage locations, information identifying the conditions that are to be satisfied before the corresponding time of release is valid (e.g., for media content to be transmitted to acceptor-users). Conditions may include a number of acceptances needed for a time of release to be valid and may be indicated, for example, in the media content offer received in the transmitted data structure from a content supplier. In some embodiments, conditions may be based on a potential exposure of one or more media content, time frame (e.g., release time, duration of time window for consumption, etc.) of the content, projected revenue of the content, etc.

In step 307, the server may determine whether discount tiers exist. Discount tiers may be similar to the different times of release noted above, but instead of (or in addition to) identifying a different time of release, the discount tiers can identify one or more price discounts, rebates, or other incentives to users. Whether discount tiers exist may be indicated, for example, in the media content offer received in the transmitted data structure from a content supplier. Discount tiers may depend on many factors, including, for example, the number of end users or content consumers that accept an offer to consume one or more media content. For example, the more the acceptances, the greater a discount. One or more tiers for discounts may exist. As a non-limiting example, in a single tier discount system, the one or more media content may be offered at $7 if 500 end users or content consumers have accepted the media content offer. In a double tier discount structure, the one or more media content may be offered at $6 if 800 end users or content consumers have accepted the media content offer and $7 if 500 end users or content consumers have accepted the media content offer. The discount structure may include any number of tiers. In step 308, the server may store, in one or more data storage locations, information identifying one or more discount tiers. In step 309, the server may store, in one or more data storage locations, information identifying a corresponding discount for each of the one or more discount tiers, each discount being different. In step 310, the server may store, in one or more data storage locations, information identifying a minimum number of acceptances by end users and content consumers needed for each discount tier, each minimum number of acceptances being different.

Figure 4:
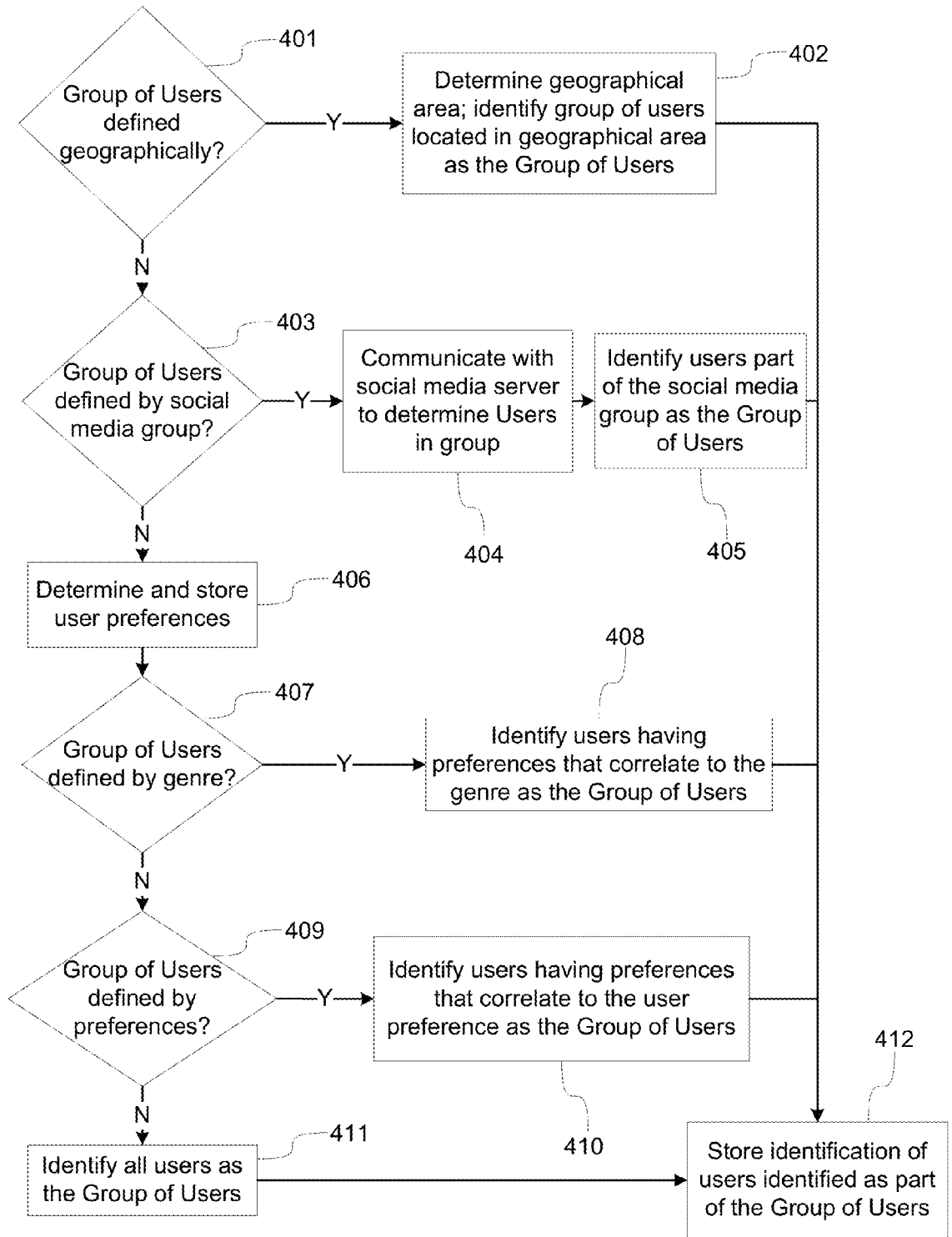
FIG. 4 illustrates an example method of identifying a group of users to receive a media content offer according to one or more illustrative aspects of the disclosure.

In step 311, the server identifies a group of users to receive a media content offer. A recipient group may include, but is not limited to, individuals registered with the content server 106, a service provided by the content server 106, an entity that owns or operates the content server 106, an entity that owns or operates a service associated with the content server 106, a social media group, a professional group, or an affinity group. As noted above, the recipient group may be identified in the transmitted data structure from the content supplier. FIG. 4 illustrates an example method of identifying a group of users to receive a media content offer according to one or more illustrative aspects of the disclosure. A group of users may be defined by one or more factors. For example, a group of users may be defined geographically. In particular, a group of users may include users connected to a particular central office 103 (e.g., a headend) or group of central offices 103. In step 401, if the server determines that the group of users is defined geographically, the server, in step 402, identifies a geographical area and identifies all users located in the identified geographical area as part of the group of users to receive a media content offer. In step 412, the server stores, in one or more data storage locations, the group of users identified by geography. Additionally, the server may store information identifying each user identified as part of the group of users.

A group of users may be defined, for example, by membership in a social media group such as a PLAXO™, FACEBOOK™, etc., social group or friends list. In step 403, if the server determines that the group of users is defined by status as part of a social media group, the server, in step 404, may communicate with one or more social media servers to determine and obtain information on users that are part of one or more social media groups. As a non-limiting example, the content server 106 may communicate with a FACEBOOK™ server to identify individuals that are part of a FACEBOOK™ group or individuals that are "friends" with a particular subscriber and obtain contact information for these individuals. In step 405, the server may identify users party to one or more social media groups as part of the group of users to receive a media content offer. In step 412, the server may store, in one or more data storage locations, information identifying the group of users identified by a social media group. Additionally, the server may store information identifying each user identified as part of the group of users. Furthermore, the server need not communicate with a social media server. For example, a server may have previously stored information identifying individuals party to one or more social media groups.

A group of users may also be defined, for example, based on user preferences. In step 406, the server may determine preferences for a plurality of users and store these preferences in one or more data storage locations. User preferences may be based on one or more factors. For example, user preferences may be predetermined. A predetermined user preference may be a preference preselected by a user. For example, each user may be given the opportunity to preselect his or her one or more favorite genre of media content. As a non-limiting example, movie and television genres may include crime, adventure, comedy, coming-of-age, mystery, action, epic, romance, horror, fantasy, thriller, and science fiction. A group may be defined as including all users who have identified a particular genre, such as crime, as their favorite genre. Different groups can be defined for different genres.

User preferences may also be based on users' viewing habits. For example, a server may store or have previously stored information on the user's previously viewed, stored, purchased, or downloaded content. This content may include media previously consumed as a result of a prior media content offer, as on demand video, as digitally recorded video, as video stored on recordable media (e.g., DVD, Blu-ray, videotape cassette, etc.), as linear television, and as other content. User preferences may also depend on other actions taken by a user (e.g., saved content searches, content saved to a view/consumption queue, etc.).

User preferences may also depend on media content consumed by another user. For example, a user's preference may depend on media content consumed by or recommended by one of the user's social media "friends." User preferences may further be defined from external sources, such as social media. For example, a social media server may transmit user preferences or other information associated with a particular user to a content server 106.

After the server 106 determines and stores preferences for a plurality of users, the server 106 may determine whether the media content offer matches preferences for one or more users or groups. In general, the server identifies users with preferences that match the media content offer as part of the group of users to receive a media content offer. Transmitting offers based on user preferences may increase likelihood of offer acceptances. In step 407, if a media content offer includes a theme or genre, the server may identify users having preferences that match the theme or genre of the media content offer, in step 408. In step 409, the server may determine whether to define a group of users based on user preferences. If so, in step 410, the server may identify users having preferences that match the media content offer as part of the group of users to receive a media content offer. In step 412, the server stores, in one or more data storage locations, the group of users. Additionally, the server may store information identifying each user identified as part of the group of users.

In step 411, if the server determines that no particular group of users should be targeted with the offer, the server may identify all users as part of the group of users to receive a media content offer. Users may include, but are not limited to, users registered with the content server 106, a service provided by the content server 106, an entity that owns or operates the content server 106 or an entity that owns or operates a service associated with the content server 106. In step 412, the server stores, in one or more data storage locations, the group of users. Additionally, the server may store information identifying each user identified as part of the group of users.

In some embodiments, the server may also identify potential users (e.g., individuals interested in, but not yet customers of a service provider) as the group of users to receive a media content offer to entice the potential users to become customers. In other embodiments, the server may identify new users as the group to receive a media content offer. New users may include, for example, new subscribers of any of a service providers services, first time users of the service provider's website, etc. In other embodiments, the server may identify the group to receive a media content offer by a user's level of engagement with a service provider's services or tools, such as services or tools offered on the service provider's website.

Figure 3A:
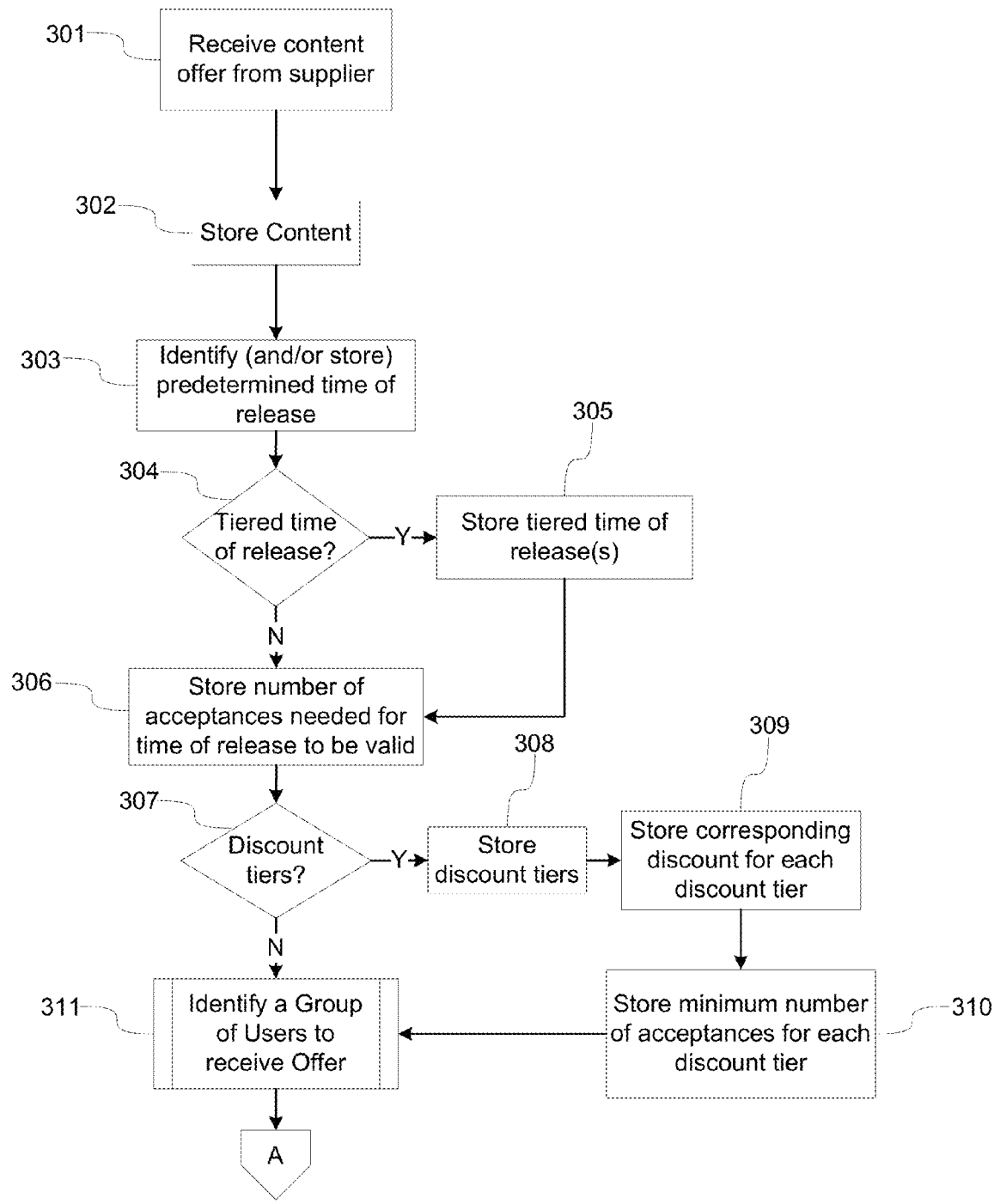
FIGS. 3A-D illustrate an example method of offering, processing, and transmitting content according to one or more illustrative aspects of the disclosure.
Figure 3B:
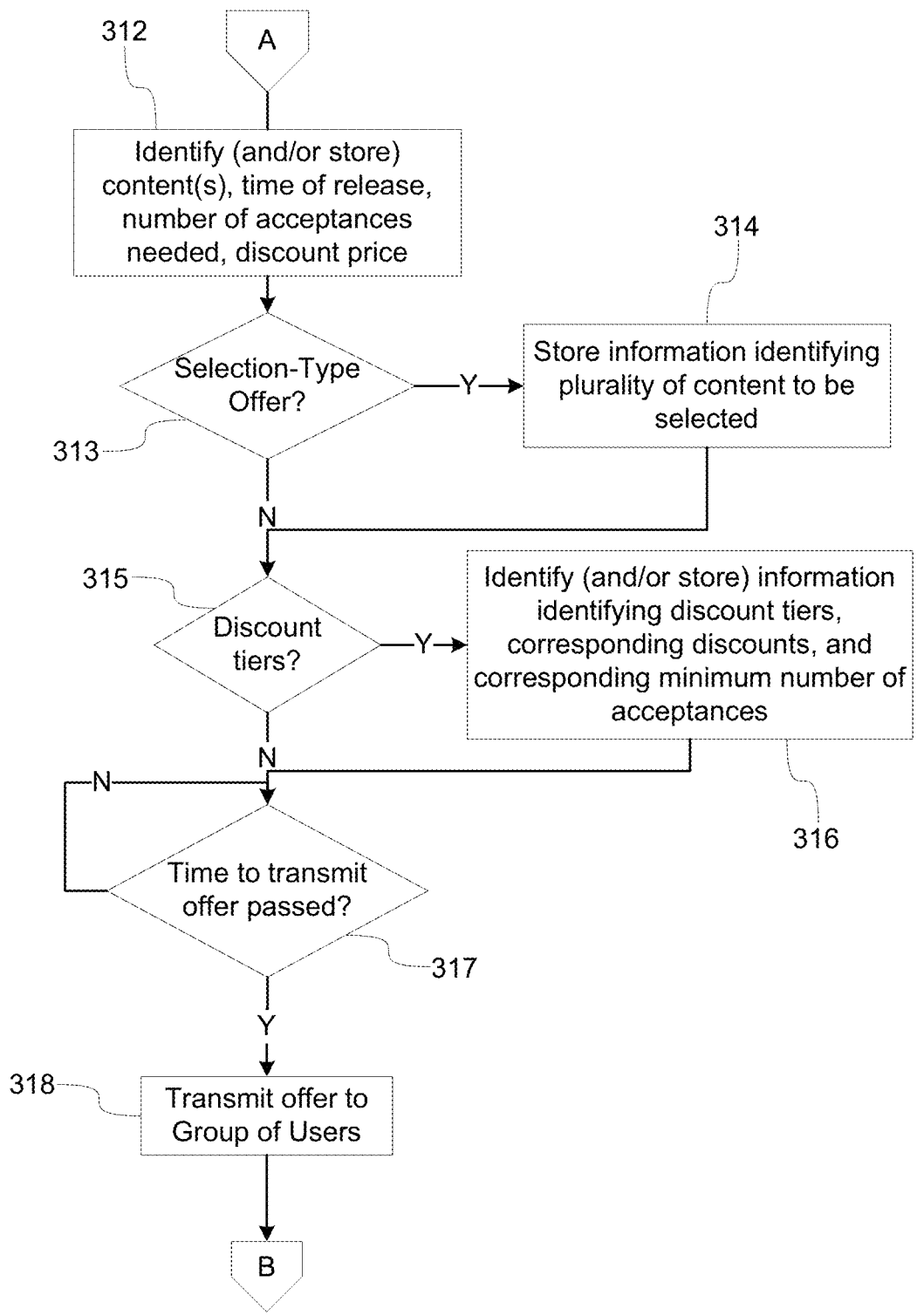
Figure 3C:
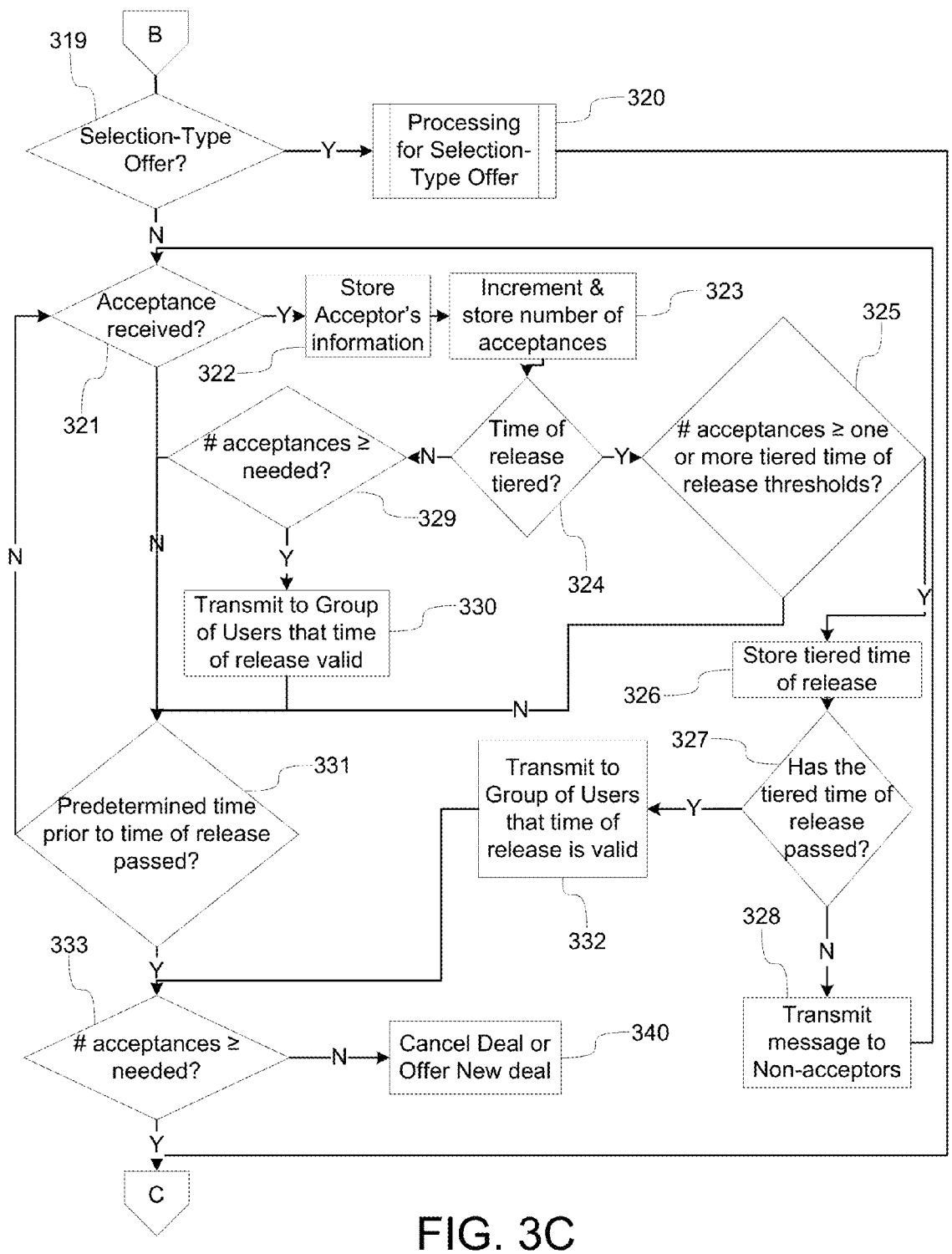

Reference is now given to FIG. 3B. In step 312, the server stores information related to the media content offer after identifying a group of users to receive a media content offer. The information may be information needed to frame a media content offer. For example, the server may store the media content or information identifying the content, the time of release, a minimum number of acceptances needed, and a discount price for the media content.

In step 313, the server determines whether an offer is a selection-type offer. Whether an offer is a selection-type offer may be indicated, for example, in the transmitted data structure from a content supplier (e.g., step 301). In a selection-type offer, a plurality of media content may be offered to recipients. The server may track the number of selections (e.g., votes) received for each media content included in the plurality of media content offered to recipients. Assuming that the number of selections for a particular media content has exceeded the number required, the media content receiving the most selections may be transmitted to part of or all of the recipients.

If the offer is a selection-type offer, the server, in step 314, may additionally store, in one or more data storage locations, media content or information identifying media content for one or more additional media content to be selected. Furthermore, the server may create a selection counter for each media content to be selected, each selection counter tracking the number of selections for a corresponding media content. The server may also store an indicator indicating the time and date that selection ends. Processing by the server for receiving selections for a selection-type offer will further be described below with respect to FIG. 5.

In step 315, the server may determine whether discount tiers exist. If so, the server, in step 316, may additionally store, in one or more data storage locations, one or more discount tiers, a corresponding discount for each of the one or more discount tiers and a minimum number of acceptances by end users and content consumers needed for each discount tier. For example, the server may store as discount prices, $6 corresponding to 800 selections and $7 corresponding to 500 selections, in a double tier discount offer.

In step 317, the server may wait to transmit an offer. For example, when a time to transmit an offer has arrived, the server, in step 318, may transmit the offer to users identified as the group of users. The offer may be transmitted, for example, to a user's gateway 111, or other user devices, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. The server may, for example, transmit the offer via email by communicating with a user's email server, which in turn communicates with one or more end-user devices. Alternatively, the server may transmit the offer through a website operated by the content server 106, a service provided by the content server 106, an entity that owns or operates the content server 106 or an entity that owns or operates a service associated with the content server 106. In this example, users may view the offer on the website. In other embodiments, a user may have previously identified a preferred means of receiving offers. The server may transmit the offer via the preferred means (e.g., via email if the user indicated a preference for email).

After transmitting one or more offers, the server may begin processing acceptances. Processing acceptances for selection-type offers may differ from processing for non-selection-type offers. Therefore, in step 319, the server may determine whether the transmitted offer is a selection-type offer. If the offer is a selection-type offer, the server, in step 320, performs processing for a selection-type offer. Processing for a selection-type offer will be described further with respect to the description of FIG. 5. If the offer is not a selection-type offer, the server may process acceptances in the manner shown in FIG. 3C.

In step 321, the server determines whether an acceptance has been received from a user. An acceptance may be of any form that generally indicates acquiescence to the offer transmitted by the server. For example, receiving payment from a user may indicate an acceptance. Furthermore, the server may cause a payment to occur once it receives payment, such as charging a credit card issuer or removing an appropriate amount from a user's bank account. In this example, the server may need to credit back the user's credit card account or bank account if there are an insufficient number of acceptances. Instead of providing payment, the user may provide payment information to the server. The server may store the payment information, but might not charge the user unless a predetermined number of users have accepted the media content offer. The predetermined number of acceptances may, for example, be the same as the number needed for the time of release to be valid. The server may use holding tanks or locking mechanisms to prevent charges until enough users accept the offer.

An acceptance need not be payment or payment information. An acceptor-user may transmit a message to the server indicating an acceptance. The message may be transmitted, for example, by clicking an "acceptance" box displayed in an offer message. The acceptance message may be transmitted in a manner similar to the transmission of the offer. For example, an acceptor-user may input an acceptance into an end-user device, including televisions 112, additional STBs 113, personal computers 114, laptop computers 115, wireless devices 116 (wireless laptops and netbooks, mobile phones, mobile televisions, personal digital assistants (PDA), etc.), and any other desired devices. The server receives the acceptance from an end-user device. In some embodiments, a user clicking an acceptance box might cause the user to be associated with the content, such as reserving the content for the user or placing an identifier of the user (e.g., name, customer ID, email address, etc.) in a list of users that have accepted an offer.

If an offer includes multiple times of release, an acceptance message from an acceptor-user may further include acceptance of all of the times of release or a subset of the times of release. As a non-limiting example, an offer may include five times of release. In an acceptance message, a user may indicate acceptance of all five times of release, conditioned on the total number of acceptances from a group of recipients reaching a threshold number of acceptances for each time of release. Alternatively, the user may indicate acceptance of a subset of the five times of release (e.g., three out of the five times of release). Therefore, allowing users to select all or a subset of the multiple times of release gives users flexibility in viewing the offered content at a convenient time.

Acceptances may also be indicated or transmitted through third party service providers. For example, one or more content or offers for content may be indicated or displayed at a third party service provider's, such as a social media provider (e.g., PLAXO™, FACEBOOK™, etc.), website or application. A user may accept an offer for content by indicating interest in the content or offer for content on the social media provider's website or application, such as by clicking a "like" button corresponding to a message or posting about the content or offer for content. Subsequently, the acceptance may be transmitted from the third party service provider, such as through a web server used by the third party, to a server providing an offer or content to users, such as one of servers 105-107.

In step 322, the server may store an acceptor-user's information in one or more storage locations. Information stored may include one or more of an acceptance, payment information, information identifying the acceptor-user, and information identifying an end-user device the user intends to consume the media content on. The end-user device may, but need not, be the same device that receives an offer or transmits an acceptance. Additionally, the user may transmit information identifying a different end-user device to consume the media content on. As a non-limiting example, the user may transmit an acceptance message from a PC, but indicate that the user intends to consume the media on a television connected to a set-top box.

In step 323, the server stores the acceptance in one or more storage locations. For example, the server may increment a number of acceptances by one each time an acceptance is received. The server may also increment a number of acceptances by a different number (e.g., two or three) based on, for example, a content offer received from a content supplier, in step 301. For example, an offer received from the content supplier may indicate that an acceptance by a particular class of users (e.g., users that have previously accepted an offer for content supplied by the same content supplier) may count as two acceptances.

In step 324, the server may determine whether a time of release is tiered. As previously described, the time of release may vary based on one or more factors, including the number of end users or content consumers that have accepted an offer. As a non-limiting example, the time of release may be earlier for more acceptances received.

If the time of release is not tiered, the server, in step 329, compares the number of acceptances to the minimum number of acceptances needed for the time of release to be valid. If the number of acceptances equals or exceeds, for example, the minimum number, the server, in step 330, may transmit to the group of users a message indicating that the time of release is valid. Alternatively, the server may send the message only to a specific group of individuals, such as acceptors or non-acceptors. The transmitted message may include additional information, such as details for how acceptors may redeem and/or consume the media content.

If the time of release is tiered, the server, in step 325, compares the number of acceptances to one or more predetermined tiered time of release thresholds, the thresholds each being a number of acceptances needed for each time of release tier. As a non-limiting example, in a three tier time of release embodiment, 1,200 acceptances may be needed for a time of release of July $1^{st}$, 800 for July $3^{rd}$, and 500 for July $5^{th}$. Generally, the server will first determine whether a number of acceptances for the earliest time of release (e.g., July $1^{st}$) has been reached. If a number of acceptances required for the earliest time of release has been reached, the server may set the time of release to the earliest time of release (e.g., July 1$^{st}$). If a number for the earliest time of release has not been reached, the server may determine whether a number of acceptances for the next earliest time of release (e.g., July 3$^{rd}$) has been reached. If a number of acceptances required for the next earliest time of release has been reached, the server may set the time of release to the next earliest time of release. Any number of tiered times of release thresholds is possible, and the server may check any remaining thresholds in a similar manner.

After determining that at least one of the thresholds for a tiered time of release has been matched and/or exceeded, the server, in step 326, may store in one or more storage locations the tiered time of release as the time of release. For example, the server may store the earliest time of release as the time of release for a corresponding number of acceptances.

In step 327, the server may determine whether a predetermined time prior to the tiered time of release or the tiered time of release has passed. A predetermined time prior to the tiered time of release may be used to provide acceptor-users sufficient notice of the release date or date of transmission of the media content. Alternatively, the server may check whether a predetermined time or a particular deadline has passed. A predetermined time or deadline may be set prior to a release date or transmission of the offer.

If the server determines that a predetermined time or tiered time of release has not passed, the server, in step 328, may transmit to the group of users a message indicating that a particular tiered time of release is now valid. Alternatively, the server may send the message to a particular group, such as acceptors and/or non-acceptors. The transmitted message may also indicate the time of release based on a current number of acceptances. The transmitted message may further indicate a number of acceptances needed to reach the next earliest time of release or any other earlier time of release. The message may further indicate to non-acceptors that a deadline to accept the offer has not passed.

If the server determines that a predetermined time or tiered time of release has passed, the server, in step 332, may transmit to the group of group of users a message indicating that the time of release is valid. Alternatively, the server may send the message to a particular group, such as acceptors and/or non-acceptors. The transmitted message may also indicate the time of release based on a current number of acceptances.

In step 331, the server determines whether a time of release, a predetermined time prior to a time of release, or a fixed deadline has passed. If not, the server may continue to process acceptances received from users until a time of release, a predetermined time prior to a time of release, or a fixed deadline has passed.

In step 333, after a window to keep the media content offer open has closed, the server determines whether the number of acceptances has matched or exceeded a minimum number of acceptances needed. If the number of acceptances is less than a minimum number of acceptances needed, the server, in step 340, may cancel the offer. After canceling the offer, the server may transmit a message to the group of users, acceptors, non-acceptors, or a combination thereof indicating that the offer has been canceled. The message may also indicate the number of acceptances needed or the number of additional acceptances needed, such as when the number is small. Instead of canceling the offer, the server may transmit a secondary offer to the group of users, acceptors, non-acceptors, or a combination thereof. The secondary offer may be similar to the first offer, e.g., require a minimum number of acceptances, include discount tiers, etc. The secondary offer may also be different from the first offer. For example, the secondary offer might not require a minimum number of acceptances.

Figure 5:
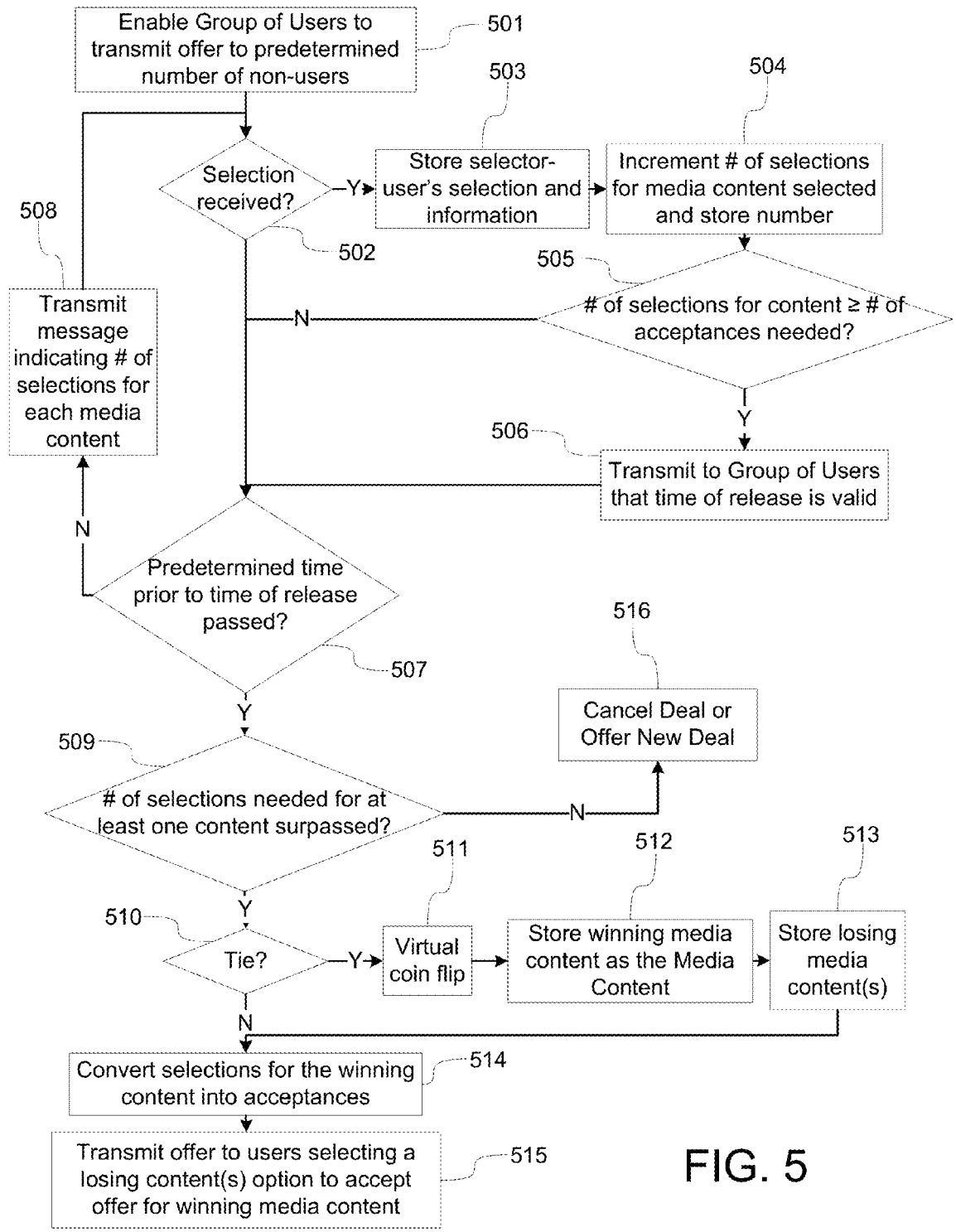
FIG. 5 illustrates an example method of processing a content offer according to one or more illustrative aspects of the disclosure.

FIG. 5 illustrates an example method of processing a content offer according to one or more illustrative aspects of the disclosure. For example, if the server determines at step 319 that the offer is a selection-type offer, the server may perform the steps shown in FIG. 5.

In step 501, the server may enable users (e.g., original recipients) that have received a media content offer to forward the offer to other users who did not receive the initial offer message. Such other users may be associated with an original recipient in one or more ways. For example, other users and an original recipient may be part of the same social media group, professional group, or affinity group. The other users may also be on the original recipient's email list. The other users, however, need not be associated with the original recipient in the above-described ways and may be associated with an original recipient in any way. The server may also limit the number of other users that may receive a forwarded offer. For example, the server may allow an original recipient to forward an offer to up to a predetermined number of other users. The server may also limit the content that another user may select. For example, the server may allow other users to select only media content selected by the inviting original recipient. Original recipients may use an end-user device, such as televisions 112, additional STBs 113, personal computers 114, laptop computers 115, wireless devices 116 (wireless laptops and netbooks, mobile phones, mobile televisions, personal digital assistants (PDA), etc.), and any other desired devices, to forward the offer.

In step 502, the server determines whether a selection from a user (or invited other user) has been received. A selection may be of any form that generally indicates acquiescence to an offer transmitted by the server. Similar to step 321, a selection may be payment, providing payment information, or a message indicating acceptance transmitted by an end-user device. Additionally, in a selection-type offer, an acceptance message may be transmitted by clicking a "select" or equivalent box (e.g., check box, radio button, drop-down list, push-button, or other graphical user interface element) displayed in the offer message. Selection-type offers may also include a voting feature where a user selects one or more content by voting for the one or more content. For example, an offer transmitted to the user (e.g., in step 318 or step 501) may include "vote for" boxes for each content offered. In this example, an acceptance message may be transmitted by the user clicking the "vote for" box for one or more of the offered content.

In step 503, the server may store a selector's information in one or more storage locations. Information stored may include one or more of a selection, payment information, information identifying the selector and information identifying an end-user device the user intends to use to consume the media content. The end-user device may, but need not be, the same device that the user uses to transmit a selection message. The user may also transmit information identifying a different consumption device. As a non-limiting example, the user may transmit an acceptance message from a PC, but indicate that the media will be consumed using a television connected to a set-top box.

In step 504, the server may store the selection in one or more storage locations. For example, the server may increment a number of selections by one each time a selection is received for a particular media content.

In step 505, the server may compare the number of selections for at least one media content to the minimum number of acceptances needed for a time of release to be valid. If the number of selections equals or exceeds the minimum number, the server, in step 506, may transmit to the group of users and/or invited other users a message indicating that the time of release is valid. Alternatively, the server may send the message to a particular group, such as selectors or non-selectors. The transmitted message may include additional information, such as details for how selectors may redeem and/or consume the media content.

In step 507, the server may determine whether a time of release, a predetermined time prior to the time of release, or a fixed deadline has passed. If not, the server may continue to process received selections until a time of release, a predetermined time prior to the time of release, or a fixed deadline has passed. Additionally, the server, in step 508, may transmit to the group of users and invited other users a message indicating a current number of selections for each media content and/or a time left to select media content.

In step 509, after a window to keep open an offer has closed, the server determines whether the number of selections for one or more media content has matched or exceeded a minimum number of acceptances needed. If the number of selections is lower than the minimum number of acceptances needed, the server, in step 516, may cancel the offer. After canceling the offer, the server may transmit a message to the group of users, invited other users, selectors, non-selectors, or a combination thereof indicating that the offer has been canceled. The message may also indicate the number of selections needed or the number of additional selections needed for one or more media content, such as when the number is small. Instead of canceling the offer, the server may transmit a secondary offer to the group of users, invited other users, acceptors, non-acceptors, or a combination thereof. The secondary offer may be similar to the first offer, e.g., require a minimum number of acceptances, include discount tiers, etc. The secondary offer may also be different from the first offer. For example, the secondary offer might not require a minimum number of acceptances.

If the number of selections for one or more media content has matched or exceeded a minimum number required, the server, in step 510, may determine whether there are any tie selections for two or more media content. In step 511, a virtual coin flip, for example, may be performed to break any ties. Any other method known in the art may be used to break the tie. For example, the server may perform a vote-off among tied media content. The vote-off, for example, may allow all selectors to vote for one of the tied media content. A vote-off may last a predetermined amount of time. Alternatively, the server may extend the time period to keep the offer open for a predetermined amount of time and allow more selections to be cast. In step 512, the server may store, in one or more data storage locations, the winning media content or information identifying the winning media content. In step 513, the server may store, in one or more data storage locations, the losing media content(s) or information identifying the losing media content(s).

In step 514, the server may convert each selection for the winning media content into an acceptance. In one embodiment, a user may simultaneously select and accept (e.g., pay for) the media content, in which case the server might not need to perform step 514. In another embodiment, a user may select a media content. Then, after a winning media content has been determined by the server, the user may be allowed to accept (e.g., pay for) the media content. In this embodiment, the server may convert the selection into an acceptance once the selector provides payment or payment information. Similar to step 321, an acceptance may be of any form that generally indicates acquiescence to an offer (e.g., payment, payment information, acceptance message).

In step 515, the server may transmit an offer to users that selected one of the losing media content(s), including an option to accept an offer for the winning media content at a predetermined price. The predetermined discount price may be the same or higher than a discount price paid by the users that selected the winning media content.

Figure 3D:
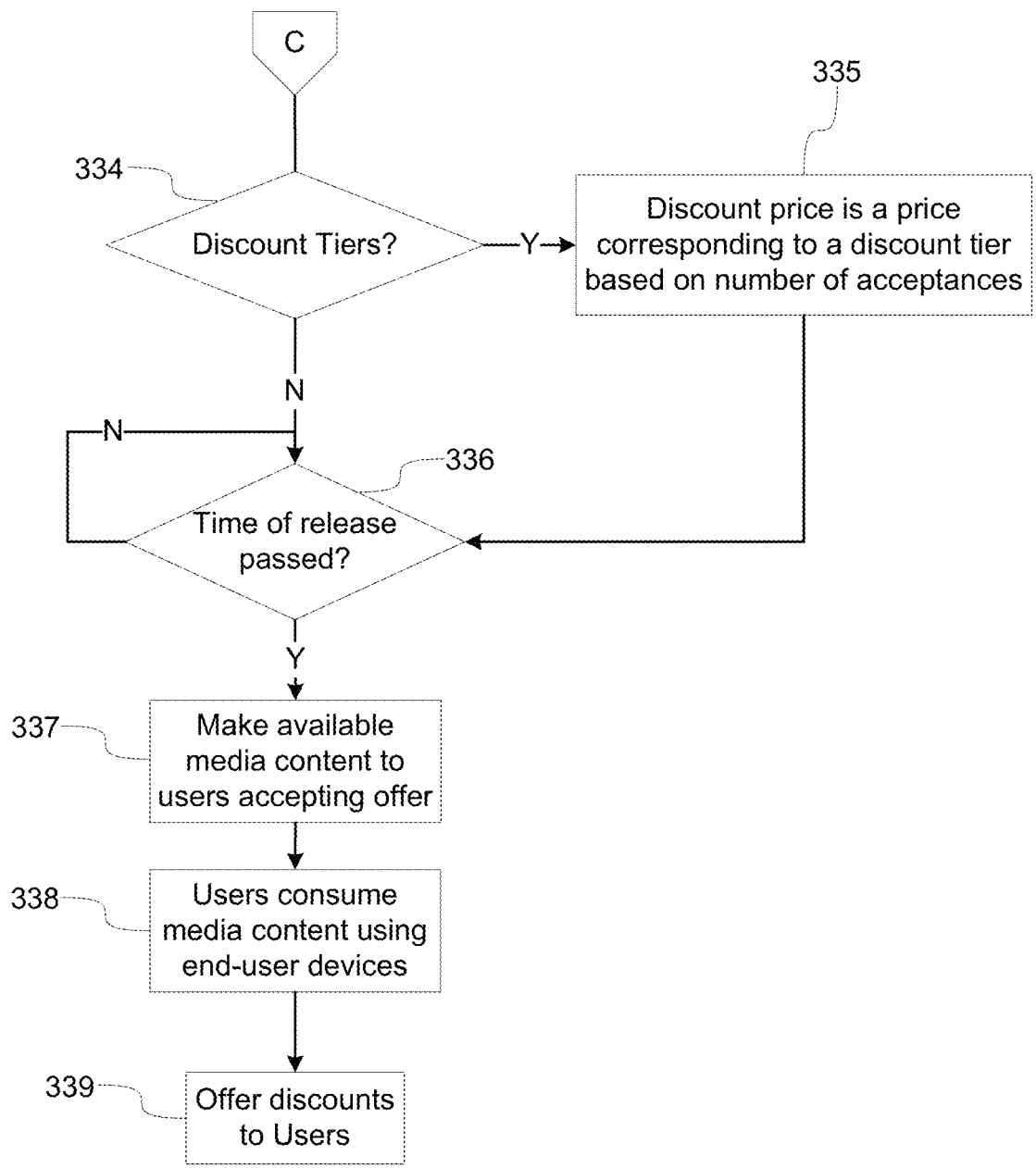

Reference is now given to FIG. 3D. In step 334, the server may determine if discount tiers exist. In step 335, if discount tiers exist, the server may determine which tier the offer falls under by comparing the number of acceptances to the number required for each discount tier. The server then stores, in one or more storage locations, the price corresponding to the correct discount tier based on the number of acceptances as the media content discount price.

In step 336, the server may determine if the time of release, whether fixed or tiered, has arrived. For example, step 336 may allow the server to wait until the appropriate time to make the media content available to the acceptor-users. In step 337, after the time of release has passed, the server may make the media content available to the acceptor-users, such as by transmitting the content to acceptor-users, storing the content at the server or at a user device, or otherwise allowing acceptor-users to instantly access or access at a later time the media content. Media content may be transmitted to acceptor-users using, for example, a unicast for each acceptor-user or a multicast for all acceptor-users. Media content may also be transmitted to acceptor-users by transmitting one or more video on demand sessions containing the media content. For example, the server may transmit one or more video on demand sessions having a theatrical release movie. As described in the examples above, the video on demand session may be transmitted at any time. For example, a video on demand session may be transmitted on the release night of a theatrical release movie. Furthermore, the time of transmission may correspond to a theatrical release time of a theatrical release movie. As another example, a video on demand session may be transmitted, either wholly or partly, prior to the release time of a theatrical release movie. For example, a video on demand session may be fully transmitted prior to the theatrical release time, or a video on demand session may only be partially transmitted at the theatrical release time.

In step 338, the users may consume the received media content using one or more end-user devices. End-user devices include, but are not limited to, televisions 112, additional STBs 113, personal computers 114, laptop computers 115, wireless devices 116 (wireless laptops and netbooks, mobile phones, mobile televisions, personal digital assistants (PDA), etc.), and any other desired devices. Furthermore, users may have a predetermined window to consume content. As a non-limiting example, if the time of release is prior to the theatrical release date of a movie (e.g., within a week prior to a theatrical release date), the viewing window may extend from the time of release to the theatrical release date of the movie or a predetermined time prior to or after the theatrical release date of the movie. As another non-limiting example, the viewing window may extend from a theatrical release date of the movie to a predetermined time thereafter. The viewing window may also extend, for example, from a predetermined time prior to the theatrical release to a predetermined time after the theatrical release of the movie. One having ordinary skill in the art would recognize that the viewing window need not be defined with respect to a theatrical release. As a non-limiting example, the viewing window may depend on a DVD release date of a movie, in a similar manner as previously explained with respect to a theatrical release date.

Furthermore, as previously recognized, the media content need not be a movie. Rather, media content include, but are not limited to, audio content, video content, audiovisual content, and other data content. Examples of audio content include, but are not limited to, recorded, streaming, or live music, book recordings, live or recorded lectures, audio content extracted from audiovisual content, etc. Examples of video content include, but are not limited to, movies, television shows, lectures, concerts, operas, etc. In particular, movie content may, for example, include a theatrical release of a movie, a DVD release of a movie, a video on demand (VOD) release of a movie, and an online on demand release of a movie.

Instead of a viewing window, users may be required to consume the media content when it is sent or at a predetermined time or forfeit a right to consume the content. For example, users may be required to view the content on the theatrical release date of a movie. In any of the previously described examples, users may be limited by the number of times they may consume the media. The number of times may, but need not, be defined by whether the media content was purchased, rented, or a combination thereof. For example, in the example of a rental, the user may be limited to a single or other predetermined number of viewing times. In the example of a purchase, the user may generally view the content an unlimited number of times. In the example of a hybrid purchase/rental, the user may be required to pay a rental fee each time the user views the content, but is not otherwise limited by the number of viewing times. As a non-limiting example, in a hybrid purchase/rental, the user may be required to "purchase" the content at a fixed price, such as $4, and pay a "rental fee," such as $0.50, for each viewing.

Additionally, in each of the previous examples (e.g., purchase, rental, hybrid), users may be limited to a time window for transmission and/or consumption for retransmitted media content. For example, users may be allowed an unlimited number of views within a predetermined and fixed time window (e.g., unlimited views from time of release to one week thereafter). As another non-limiting example, users may be allowed a limited number of views within a predetermined and fixed time window (e.g., 3 views from time of release to one week thereafter). Similarly, the start time of a time window for retransmission and/or re-consumption need not be fixed. As a non-limiting example, a start time of a time window may be at the first instance of consumption (e.g., first viewing of media content). Furthermore, the time window may extend from a start time of a tiered time window to a predetermined time thereafter (e.g., time window extends from first viewing of media content to one week thereafter).

Similar to discount and time of release tiers, the time window for transmission and/or consumption and the number of views may depend on the number of acceptances. For example, users may be given a larger time window for transmission and/or consumption the greater the number of acceptances. As another example, users may be given a greater number of views the greater the number of acceptances.

The server may also detect and store the number of times one or more users has accessed media content (e.g., number of transmissions, retransmissions, consumptions, re-consumptions, etc.), for example, when the media content is rented. An access number may be the number of times one or more users has accessed the media content within a predetermined time window, such as a time window for retransmitting and/or re-consuming content. If one or more users has accessed the content more than a predetermined number of times, the server may transmit an offer message to the one or more users for purchasing a copy of the media content. The offer message may also include, for example, a purchase price for a copy of the media content.

In another embodiment, the server may allow users to view the transmitted content together as, for example, a temporary viewing group that may be formed for the purpose of a single viewing of the content (e.g., an early release viewing), and which can be disbanded after the viewing. The users of the temporary viewing group may be associated with one another. For example, the users may be associated with one another in any manner previously described with respect to FIG. 4 (e.g., geography, social media, genre, user preferences, etc.). Users may be associated with one another in any other way, including, but not limited to membership in a professional or affinity group. The server may receive a request from one or more users requesting formation of the temporary viewing group. In response to the request, the server may group users into the requested temporary viewing group. Alternatively, the server may transmit messages to users identified as members of the temporary viewing group requesting permission to be added to a temporary viewing group. The identified users may then be given an opportunity (e.g., within a predetermined time window) to accept or decline addition to the temporary viewing group. After a temporary viewing group has been formed, the server may simultaneously transmit the media content to members of the temporary viewing group, such as in a multicast transmission. During viewing by the temporary viewing group, users may control playback navigation of the media content. Furthermore, playback control by one member of the temporary viewing group may be shared with viewing devices of other members of the group. As a non-limiting example, if a member of the group pauses playback of media content, playback may additionally be paused for all other members of the group. Shared playback control may, but need not, be provided to all members of the group. For example, the server may provide playback control to fewer than all of the members of the group.

In step 339, the server may transmit additional discounts and/or offers to the users. These additional discounts and/or offers may include offers to purchase a copy of the media content, discounts for consuming the media content a second time, discounts for future offers, monetary discounts, and/or discounts for other content or services offered by the server. The discount and/or offer may also include a discount on one or more of the losing media content in the selection-type offers. The discounts and/or offers may be transmitted to the users at any time. For example, discounts and/or offers may be transmitted prior to, during, or after consumption of the media content. Transmission of discounts and/or offers may also be conditioned on the user taking action. As a non-limiting example, discounts and/or offers may require a user to advertise the media content delivery service or media content on social media. The server may verify that the media content or media content delivery service was advertised. Discounts and/or offers may also require a user to get one or more other users to register with the media content delivery service.

The various features described above are merely non-limiting examples, and can be rearranged, combined, subdivided, omitted, and/or altered in any desired manner. For example, features of the server 106 can be subdivided among multiple processors and computing devices. The true scope of this patent should only be defined by the claims that follow.

We claim:

1. A method, comprising:
   determining a plurality of time of release tiers for a content asset, each of the time of release tiers comprising a different minimum number of acceptances and a corresponding time of release; and in response to determining that a number of acceptances to view the content asset at a first time prior to a release date of the content asset exceeded one of the difficult minimum number of acceptances, configuring a computer device to make available for transmission at least one video on demand session comprising the content asset to accepting users prior to the release date of the content asset.

2. The method of claim 1, wherein the at least one video on demand session is a multicast video session, and is made available for transmission within a week prior to the release date of the content asset.

3. The method of claim 1, further comprising:
identifying a group pricing discount for the content asset, which comprises determining a plurality of group discount tiers, each of the group discount tiers comprising a different minimum number of acceptances and corresponding discount.

4. The method of claim 1, further comprising:
grouping, in response to a first user's request, a subset of the accepting users into a content asset temporary viewing group for the first user, wherein the subset of the accepting users is associated with the first user via a social networking service.

5. The method of claim 4, wherein making available for transmission the at least one video on demand session comprises making available for transmission a multicast transmission to members of the temporary viewing group, and wherein playback navigation controls by one member of the temporary viewing group are shared with viewing devices of other members of the temporary viewing group during the multicast transmission.

6. The method of claim 1, wherein the corresponding time of release for each of the time of release tiers is determined based, at least in part, on utilization of a media content delivery system.

7. The method of claim 6, further comprising:
determining that a number of times a first user of the one or more of the accepting users has accessed the content asset during a time window for retransmission, and in response to the first user accessing the content asset more than a first predetermined minimum retransmission amount during the time window for retransmissions, transmitting an offer message to the first user for purchasing a copy of the content asset.

8. The method of claim 1, further comprising using the number of acceptances to view the content asset to select the first time from multiple times, each of the multiple times corresponding to a different minimum number of acceptances.

9. The method of claim 1, further comprising:
determining that one or more preferences for an accepting user of the accepting users matches the content asset; and
transmitting to a plurality of users, including the accepting users, an offer message for the first time.

10. The method of claim 9, wherein the one or more preferences comprises at least one of a genre preselected by the accepting user, a genre of a content asset previously purchased or viewed by the accepting user, and one or more preferences derived from a social media account associated with the accepting user.

11. A method, comprising:
transmitting, to a plurality of users, a message comprising an offer to view a content asset, prior to a release date of the content asset;
storing a first criterion value identifying a first minimum number of acceptances for the content asset, and a second criterion value identifying a second minimum number of acceptances for the content asset, wherein the second minimum number of acceptances is greater than the first minimum number of acceptances; and
if a number of acceptances received from accepting users, prior to the release date of the content asset, exceeds the first minimum number of acceptances, configuring a computing device to provide the accepting users access to a video on demand session for viewing the content asset prior to a first time of release for the content asset, and
if the number of acceptances received from accepting users exceeds the second minimum number of acceptances, configuring the computing device to provide the accepting users access to a video on demand session for viewing the content asset prior to a second time of release for the content asset, wherein the second time of release is earlier than the first time of release
wherein a first time of release, prior to the release date of the content asset, corresponds to the first minimum number of acceptances, and a second time of release, earlier than the first time of release, corresponds to a second minimum number of acceptances.

12. The method of claim 11, further comprising:
determining multiple times of release for the content asset based, at least in part, on utilization of a media content delivery system.

13. A method, comprising:
determining multiple times of release for a content asset, which are before the content asset is available for public consumption, each time of release corresponding to a different minimum number of acceptances;
receiving an acceptance from a plurality of accepting users, prior to the multiple times of release; and
in response to determining that a number of the acceptances has met or exceeded one of the different minimum number of acceptances, configuring a computer device to make available for transmission at least one video on demand session comprising the content asset to the plurality of accepting users before the content asset is available for public consumption.

14. The method of claim 13, further comprising:
determining a group pricing discount for the content asset comprising a plurality of group discount tiers, each of the group discount tiers comprising a different minimum number of acceptances and corresponding discount.

15. The method of claim 13, wherein the multiple times of release are determined based, at least in part, on utilization of a media content delivery system.

16. The method of claim 15, further comprising:
identifying, in a single acceptance, a plurality of responses corresponding to the multiple times of release.

17. The method of claim 15, further comprising:
configuring the computer device to make available for retransmission the content asset to one or more accepting users in the plurality of accepting users, and limit the one or more accepting users to a time window for retransmissions.

18. The method of claim 17, further comprising:
determining a number of times that a first user of the one or more accepting users has accessed the content asset during the time window for retransmissions, and
in response to the first user accessing the content asset more than a first predetermined minimum retransmission amount during the time window for retransmissions, transmit an offer message to the first user for purchasing a copy of the content asset.

19. The method of claim 13, further comprising:
configuring the computing device to make available for transmission one or more video on demand sessions as a multicast video session within a week before the content asset is available for public consumption.

\* \* \* \* \*

UNITED STATES PATENT AND TRADEMARK OFFICE
CERTIFICATE OF CORRECTION

| | | |
|---|---|---|
| PATENT NO. | : 8,973,066 B2 | Page 1 of 1 |
| APPLICATION NO. | : 13/295444 | |
| DATED | : March 3, 2015 | |
| INVENTOR(S) | : Scott Hilson et al. | |

It is certified that error appears in the above-identified patent and that said Letters Patent is hereby corrected as shown below:

In the Claims

Column 19, Line 5:
In Claim 1, please delete "difficult" and insert --different--

Signed and Sealed this
Eighth Day of September, 2015

Michelle K. Lee
*Director of the United States Patent and Trademark Office*